F. BAYNES.
WHEELED SEAT.
APPLICATION FILED NOV. 15, 1920.
1,369,216.
Patented Feb. 22, 1921.
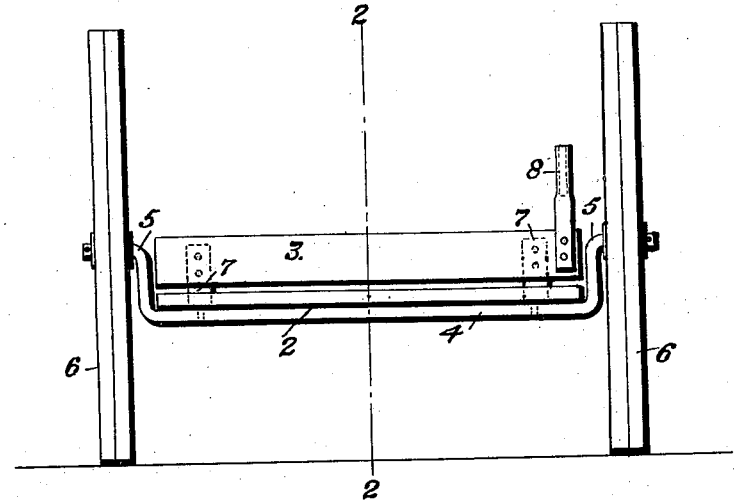
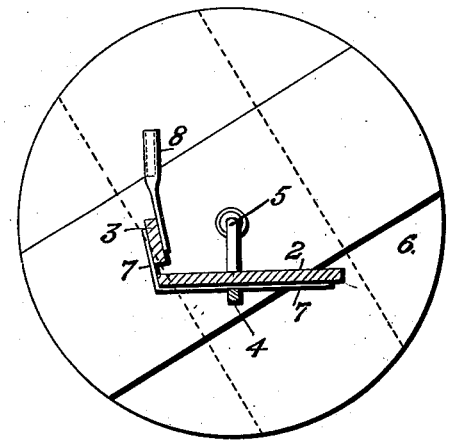
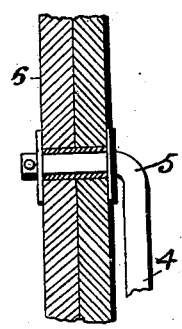
Inventor
Francis Baynes.
By Fred G. Dieterich
Attorneys

UNITED STATES PATENT OFFICE.

FRANCIS BAYNES, OF VANCOUVER, BRITISH COLUMBIA, CANADA.

WHEELED SEAT.

1,369,216.  Specification of Letters Patent.  Patented Feb. 22, 1921.

Application filed November 15, 1920. Serial No. 424,294.

*To all whom it may concern:*

Be it known that I, FRANCIS BAYNES, citizen of the Dominion of Canada, residing at Vancouver, in the Province of British Columbia, Canada, have invented certain new and useful Improvements in Wheeled Seats, of which the following is a specification.

This invention relates to a wheeled seat designed to facilitate the picking of strawberries and to lessen the labor and fatigue of such work, which is necessarily conducted at a time of the year when the sun is hot and the fatigue of stooping is most trying.

As the device is not applicable for purposes other than that for which it is designed and the period of picking is of short duration, it is desirable that the device should be produced as cheaply as possible.

The invention is particularly described in the following specification, reference being made to the drawings by which it is accompanied, in which:

Figure 1 is a front elevation of the device.

Fig. 2, a sectional elevation on the line 2—2 in Fig. 1, and

Fig. 3, a detail to an enlarged scale of the axle end in one of the wheels.

In these drawings 2 represents a seat having a low back 3 which may be connected to the seat by strips of flat iron 7 secured to the underside of the seat and bent upward to receive the back and leave a clear space between the seat and the back.

This seat 2 is supported on an axle 4 to which it is secured by rivets through the irons 7. The ends of this axle 4 are upwardly and outwardly turned as at 5 and these ends are rounded to receive wheels 6 which are freely rotatable on the axle ends.

The depression of the intermediate portion of the axle is such in relation to the diameter of the wheels as to bring the seat to a height above the ground level that will enable the picker to comfortably bend over to pick the fruit from the plants, and the width of the wheels apart is such as will clear the plants in the row between the wheels and enable wheeled seats on adjacent rows to pass one another.

The diameter of the wheels should be such as will allow the vehicle to be readily pushed backward along the row of plants by the feet of the picker, one on each side of the row.

As will be seen from the drawing, the preponderating area of the seat is slightly in front of the axle and the low back prevents the picker from sitting too far back, so that in use the seat will tip slightly downward toward the front to aid the stooping position of the picker and to facilitate pushing the wheeled seat backward while picking.

At present the work of picking strawberries is largely left to orientals, who are accustomed to work in a stooping or crouching position, and to children because of the fatigue imposed on adults: but the use of this simple, but eminently convenient and useful device opens this field of labor to adults of our own race, by lessening the fatigue and discomfort of stooping to the low growing plants.

A tubular socket 8 may be secured to one or both sides of the seat in which an umbrella or the like may be placed to shelter the head and neck of the picker from the sun, while stooping.

I do not desire to be confined to the particular construction of the device as herein set forth and illustrated, but claim as my invention a wheeled seat adapted to afford support to a strawberry picker while in the stooping position with the feet on the ground.

Having now particularly described my invention, I hereby declare that what I claim as new and desire to be protected in, by Letters Patent, is:

1. A wheeled seat for strawberry picking, comprising in combination a pair of wheels, an axle on each opposite end of which one of the wheels is rotatably mounted, which axle intermediate of the wheels is downwardly bent toward the ground, and a seat secured on the intermediate depressed portion of the axle and adapted to support a picker while in the stooping position with the feet on the ground.

2. A wheeled seat for strawberry picking, comprising in combination a pair of wheels, an axle on each opposite end of which one of the wheels is rotatably mounted, which axle intermediate of the wheels is downwardly bent toward the ground, and a seat having a low back secured on the intermediate depressed portion of the axle and adapted to support a picker while in the stooping position with the feet on the ground.

3. A wheeled seat for strawberry picking, comprising in combination a pair of wheels, an axle on each opposite end of which one of the wheels is rotatably mounted, which axle intermediate of the wheels is downwardly bent toward the ground and a seat secured on the intermediate depressed portion of the axle, said seat having a preponderating area in advance of the axle and adapted to support a picker while in the stooping position with the feet on the ground.

4. A wheeled seat for strawberry picking, comprising in combination a pair of wheels, an axle on each opposite end of which one of the wheels is rotatably mounted, which axle intermediate of the wheels is downwardly bent toward the ground, and a seat secured on the intermediate depressed portion of the axle, said seat adapted to tilt downward toward the front when occupied by a picker.

In testimony whereof I affix my signature.

FRANCIS BAYNES.